(12) United States Patent
Cooney et al.

(10) Patent No.: US 8,428,215 B2
(45) Date of Patent: Apr. 23, 2013

(54) METHOD OF IMPROVING THE SPENT NUCLEAR FUEL BURNUP CREDIT

(75) Inventors: Barry F. Cooney, Bethel Park, PA (US); Thomas M. Camden, Jr., Apollo, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 939 days.

(21) Appl. No.: 11/961,196

(22) Filed: Dec. 20, 2007

(65) Prior Publication Data
US 2011/0216869 A1    Sep. 8, 2011

(51) Int. Cl.
*G21C 19/00*    (2006.01)

(52) U.S. Cl.
USPC .......................................... 376/272; 376/260

(58) Field of Classification Search .................. 376/257, 376/254, 245, 259, 272; 250/506.1, 507.1
See application file for complete search history.

(56) References Cited

U.S. PATENT DOCUMENTS

| | | |
|---|---|---|
| 5,793,636 A | 8/1998 | Cooney et al. |
| 5,969,359 A | 10/1999 | Ruddy et al. |
| 6,252,923 B1 | 6/2001 | Iacovino et al. |

OTHER PUBLICATIONS

U.S. Nuclear Regulatory Commission, "Packaging and transportation of Radioactive Material", Part 71 of 10 C.F.R., NRC Regulations (2004).*

* cited by examiner

*Primary Examiner* — Jack W Keith
*Assistant Examiner* — Marshall O'Connor

(57) ABSTRACT

A dimensional reactivity management system that takes into account the axial burnup shape data of a nuclear fuel assembly to determine the acceptability of placement of the assembly relative to other assemblies in a storage container.

5 Claims, 5 Drawing Sheets

METHOD OF IMPROVING THE SPENT NUCLEAR FUEL BURNUP CREDIT

BACKGROUND OF THE INVENTION

1. Field of the Invention

This invention pertains in general to the storage of spent nuclear fuel and more particularly to a method of calculating the burnup credit for spent nuclear fuel rods.

2. Description of the Prior Art

Transportation and shipment of spent nuclear fuel for eventual disposal is regulated by the Nuclear Regulatory Commission (NRC) through the requirements of Title 10 of the Code of Federal Regulations, Part 71. To meet the requirements of 10 CFR §71, transportation casks must be designed to ensure criticality safety. The safety analyses for these transportation casks are presently based on the assumption that the fuel assemblies are unirradiated, i.e., the fissile content is the same as the as-manufactured assembly. This assumption is conservative in the spent nuclear fuel case, as the fissile isotopes have been burned up as a result of the use of the fuel assembly in a reactor and, therefore, the fissile isotope content of the assembly is much lower than the as-manufactured content.

The capacity of transportation casks can be severely limited by the "fresh fuel" assumption, as larger criticality safety margins exist in the spent fuel assembly case. If credit could be taken for the burnup of the assemblies, cost savings in the transportation of spent fuel assemblies would result. In the development of canisters in support of dry storage of spent nuclear fuel, approval has been sought for a burnup credit methodology in support of package loading. The burnup credit methodology will rely on a combination of calculated burnup using reactor records, and burnup verification measurements to verify reactor records.

With increasing emphasis on issues related to the shipment of fuel for eventual disposition, burnup verification measurements and methodology are assuming a role of greater importance. The "fresh fuel" assumption results in very conservative designs for spent fuel racks, shipping canisters and waste repository storage. These overly conservative designs result in increased costs for the storage and shipping of spent nuclear fuel.

In order to take advantage of burnup credit for spent nuclear fuel, a method must be in place to reliably verify the fissionable content of fuel assemblies to ensure that criticality safety limits are not exceeded. Typical burnup verification methods require measurements of fuel assemblies to confirm reactor records of initial enrichment, burnup and decay time. These measurements rely on determining the neutron flux and, in some cases, the gamma dose in the vicinity of the fuel centerline.

The measurement technology in presently available commercial systems relies on $^{235}$U fission chambers to measure the neutron specific activity and either gamma ionization chambers, gamma scintillation detectors or solid-state semiconductor detectors (high-purity germanium HPGe), to detect gamma rays. Fission chambers and gamma ionization chambers are rather large gas-filled detectors. NaI(Tl) scintillation gamma ray detectors are typically large and require a photomultiplier tube and gamma ray shielding for operation in a spent fuel environment. HPGe gamma ray detectors require a liquid nitrogen cryogenic system or an electronic cooling system, since they are not capable of operation as high-resolution gamma ray detectors at higher temperatures. These detectors are sensitive to environmental factors such as temperature and the intense, mixed gamma ray and neutron field. For example, fission chambers are sensitive to gamma ray background, and gamma ionization chambers, NaI(Tl) detectors and HPGe detectors are all sensitive to neutron-induced background.

During the course of the use of a fuel assembly in a reactor core, higher actinides are produced by a chain of neutron captures followed by beta decay. In uranium fuel, the higher-actinide buildup chain originates with the $^{238}$U present in the fuel. Many of the higher actinides decay by spontaneous fission, a process which is accompanied by the emission of neutrons associated with fission. A secondary source of neutrons exists in oxide fuels where neutrons can be produced via the action of energetic alpha particles (primarily from the decay of higher actinides) on the $^{18}$O isotope of oxygen. It has been demonstrated by many workers that the neutron specific activity of spent fuel is related to burnup. Detailed mathematical relationships between the neutron emission rate and burnup have also been inferred using measurements on spent fuel assemblies. The functional form of this relationship is that the neutron emission rate is a function of assembly burnup raised to a power.

Variables that affect the neutron emission rate include fuel type, initial enrichment, power history and decay time since discharge of the fuel assembly from the reactor.

Although spontaneously fissioning plutonium isotopes and plutonium alpha emitters are the dominant source of neutrons during the first fuel operation cycle, longer reactor core exposure times result in the production of curium isotopes which become the predominant source of the neutron specific activity for the spent fuel assembly. Most of the neutron emission will result from $^{242}$Cm (163 day half life) and $^{244}$Cm (17.9 year half life). For decay times more than a few years, $^{244}$Cm will be the major source of the neutron specific activity of a spent fuel assembly.

For shorter decay times, the neutron activity of $^{242}$Cm must be taken into account. Although the functional form generally covers all fuel assemblies of a particular design with different exponents for different design types, the curve will shift with initial enrichment. Therefore, knowledge of both the initial enrichment and time since discharge (decay time) are needed to accurately relate the observed neutron emission rate to burnup.

Typically, a combination of neutron measurements and reactor records are used to determine fuel burnup. In some cases, gamma ray measurements of fission product isotope gamma rays (primarily $^{137}$Cs) are used as a check on decay time. Either the gross gamma ray decay rate divided by the neutron emission rate can be related to groups of assemblies with common discharge times, or the $^{134}$Cs to $^{137}$Cs gamma decay rate ratio is measured directly to determine decay time. $^{134}$Cs has a half life of 2.06 years, and $^{137}$Cs has a half life of 30.1 years, so the decay rate ratio will change rapidly with time over a zero to 20 year time period after discharge of the fuel assembly from the reactor. A measurement of either the $^{134}$Cs/$^{137}$Cs gamma emission ratio or the gross gamma emission rate is needed to verify the time since discharge (decay time) for the assembly. In the $^{134}$Cs/$^{137}$Cs case, the gamma ray intensity ratio provides a direct measure of the decay time. In the gross-gamma case, the assumption is made that most of the observed activity is $^{137}$Cs, and the gross gamma to neutron ratios allow the assemblies to be separated into groups according to common discharge times. The exact decay time is then determined from fuel assembly records.

Whether in support of pool storage or loading for dry storage, the measurements are conventionally carried out under water on isolated fuel assemblies which are raised from the fuel storage rack with an overhead crane. The detector fixture is designed to attach reproducibly to the fuel assembly, and normally measurements are carried out at the fuel center line with simultaneous measurements taken on opposite fuel flats to correct for asymmetries in the neutron emission rates.

The burnup verification methodology generally requires measurements to be performed on a set of fuel assemblies of a given type. The functional form for the neutron response as a function of burnup is established on the basis of at least three measurements and is updated as data from newly measured assemblies are added. Outliers are identified on the basis of agreement with the predictions of the fit function (usually, greater than three standard deviations from the predicted value is grounds for rejection), and identified for further study. Either incorrect records or a problem with the measurement could be responsible for outlier data points.

A common feature of all of the systems presently in use is that dependence is placed on a single measurement at one axial location. The neutron emission rate at that location depends on the average axial power profile for the reactor. While some of the presently available systems are capable of measurements at multiple axial locations, a sequence of adjustments of the relative position of the detectors and assembly is required for each measurement at each axial location. This measurement process entails measurement times roughly proportional to the desired number of axial positions and greater risk of fuel damage due to the large number of movements involved.

U.S. Pat. No. 5,969,359, assigned to the assignee of the present invention, proposed an improved method and apparatus for performing measurements related to spent nuclear fuel burnup, employing miniature, temperature- and radiation-resistant semiconductor detectors that permit simultaneous monitoring of the gamma and neutron emission rates from spent nuclear fuel. Arrays of semiconductor detectors may be used to obtain information from key axial locations to define the axial burnup profile for spent nuclear fuel assemblies. Use of the improved spent fuel monitoring apparatus results in significant reductions in cost and time for the measurements, as well as improved accuracy, safety and reduced radiation doses to personnel involved in spent nuclear fuel measurements.

The nuclear detectors described in U.S. Pat. No. 5,969,359 preferably use a wide band gap semiconductor material such as SiC which is capable of providing data at elevated temperatures and is also a rad-hard semiconductor. Charged particle, neutron, and gamma ray detection may be accomplished with high-quality, miniature detectors having extremely low leakage currents which provide high-quality nuclear detection signals.

Such miniature semiconductor detectors are capable of determining neutron and gross gamma emission rates in a single measurement. A single semiconductor detector can therefore perform the functions of both the neutron and gamma detectors in the presently used systems. The preferred nuclear detectors based on SiC semiconductors are thus capable of measuring gamma rays and neutrons simultaneously in a single, energy-resolved spectrum.

Arrays of the semiconductor detectors can simultaneously measure neutron emission rates at key axial locations in order to define the shape of the fuel burnup profile. For example, a stringer of miniature semiconductor neutron detectors which simultaneously record data and are multiplexed to provide independent data for each axial location may provide information on the entire axial burnup profile. The semiconductor detector arrays can perform measurements within channels or on opposite flats of spent fuel assemblies.

The present burnup verification system using semiconductor nuclear detectors offers several advantages. For example, miniature semiconductor detectors can be positioned more accurately than the detectors presently in use, and can be used to determine fuel axial burnup profiles during a single measurement interval. While conventional methods rely on the use of an overhead crane to isolate a spent fuel assembly, the present semiconductor detectors can perform measurements on spent fuel assemblies that are located in fuel racks. In accordance with the present invention, measurements can be safely carried out with less personnel in a shorter time while eliminating the requirement of moving fuel assemblies for measurement. For instance, a single miniature semiconductor detector can provide the same gamma and neutron information as the two much larger neutron and gamma detectors used on present systems. The preferred semiconductor detectors are capable of highly stable operation in severe radiation and temperature environments. Because of these advantages, measurements made with the present semiconductor-based system are less costly than those made with commercial systems.

The present invention has been developed in view of the foregoing to further improve the burnup credit calculation to further reduce the safety margin that has to be built into spent fuel storage and shipping containers and thus further reduce the cost. While U.S. Pat. No. 5,969,359 provides a substantially improved way of measuring the axial profile, it uses that profile to more accurately calculate the total burnup of the assembly. The total burnup number is used to establish the burnup credit, however the shape of the axial burnup profile is not employed to further enhance the burn up credit. It is an object of this invention to take advantage of the axial burnup shape to further enhance the burnup credit.

SUMMARY OF THE INVENTION

The current conservative approach to critical analysis for the spent fuel burnup credit wherein all assemblies are assumed to have an adverse axial burnup distribution, consumes 3 to 4% in margin to the k-eff limit. If the measured axial burnup distributions were used and the criticality analysis were restructured to generate an additional dimension to the limiting curves of enrichment versus burnup, based upon the shape of the axial burnup distribution, a spent fuel burnup monitoring software such as TracWorks (described in U.S. Pat. No. 5,793,636) could implement an additional dimension of protection, providing the nuclear plant operators with significant additional storage margin (potentially delaying re-racking or cask purchases) with no adverse impact on safety. The method of this invention uses the axial burnup shape as an explicit, additional dimension of protection known as dimensional reactivity management. To implement the use of dimensional reactivity management, three separate actions are required. First, the actual axial burnup shape of each fuel assembly in the spent fuel container needs to be generated. Second, the burnup credit limits including the characterization of axial burnup shape as a separate dimension of protection, as average burnup is currently used, need to be generated. Third, an automated tool that can track the axial burnup shape data and use it to determine the acceptability of the placement of fuel in the spent fuel container needs to be implemented.

More particularly, the method of this invention determines the acceptability of the placement of a new spent fuel assembly among a number of spent fuel assemblies within a storage container. To do that the method of this invention generates a series of curves of enrichment versus current burnup, each curve representing a different number of spent fuel assemblies that have the commonly used adverse axial burnup distribution that is currently assumed by the prior art. The invention then determines the actual axial burnup distribution of each of the fuel assemblies within the container that directly surrounds the proposed placement location of the new spent fuel assembly and notes how many of the spent fuel assemblies have the adverse axial burnup distribution. The invention then determines which of the series of curves applies to the new fuel assembly from the number of spent fuel assemblies noted as having the adverse axial burnup distribution. The method then finds the point on the graph on which the applicable curve is plotted that corresponds to the current burnup and initial enrichment for the new spent fuel assembly and determines whether the point on the graph is above the applicable curve which would indicate the acceptability of the placement.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
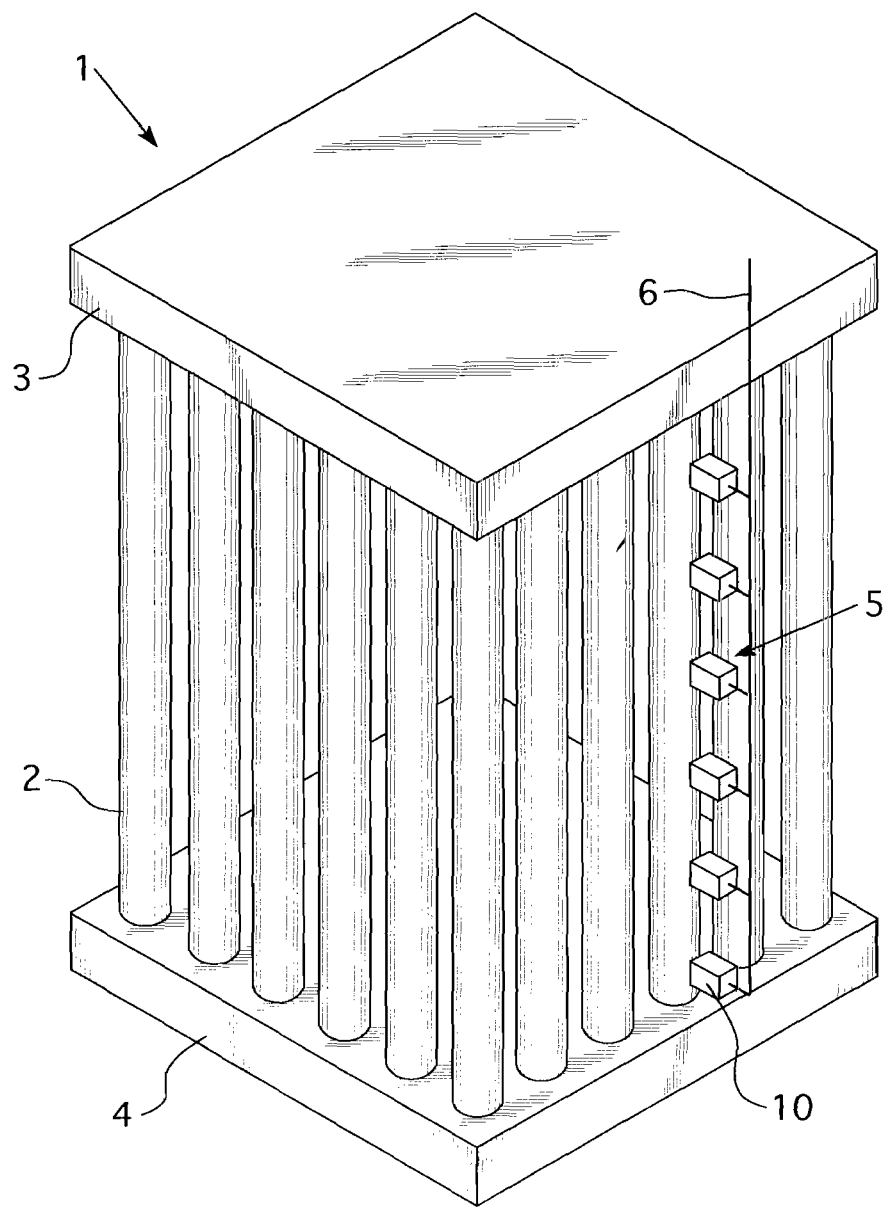
FIG. 1 is a partially schematic view of a neutron and gamma radiation detector string positioned adjacent a spent nuclear fuel assembly in accordance with an embodiment of the present invention.

FIG. 1 schematically illustrates the placement of a neutron and gamma semiconductor detector array adjacent to spent nuclear fuel in accordance with an embodiment of the present invention. As shown in FIG. 1, a system 1 is provided for measuring neutron and gamma emissions from spent nuclear fuel. As used herein, the term "neutron emissions" means production of neutrons including spontaneous fission, e.g., $^{244}$Cm decay, and ($\alpha$, n) reactions as a secondary result of a-decay of actinide isotopes. The term "gamma emissions" means production of gamma-rays as an accompaniment to spontaneous alpha and beta decay of radioactive isotopes. The nuclear fuel is typically provided in the form of at least one fuel assembly 2 secured by a top plate 3 and bottom plate 4. The fuel assemblies 2 are thus provided in the form of a rack. In the embodiment shown in FIG. 1, an array 5 of semiconductor detectors 10 is provided in a string outside the rack of fuel assemblies 2. An electrical wire 6 or other suitable means is provided to transfer electronic signals generated by the semiconductor detectors 10. The array 5 of semiconductor detectors 10 extends along the axial length of the fuel assemblies 2. This arrangement permits neutron and gamma emissions to be measured at different axial locations along the fuel assemblies 2, and also permits measurement of the axial burnup profile of the fuel assemblies 2.

Figure 2:
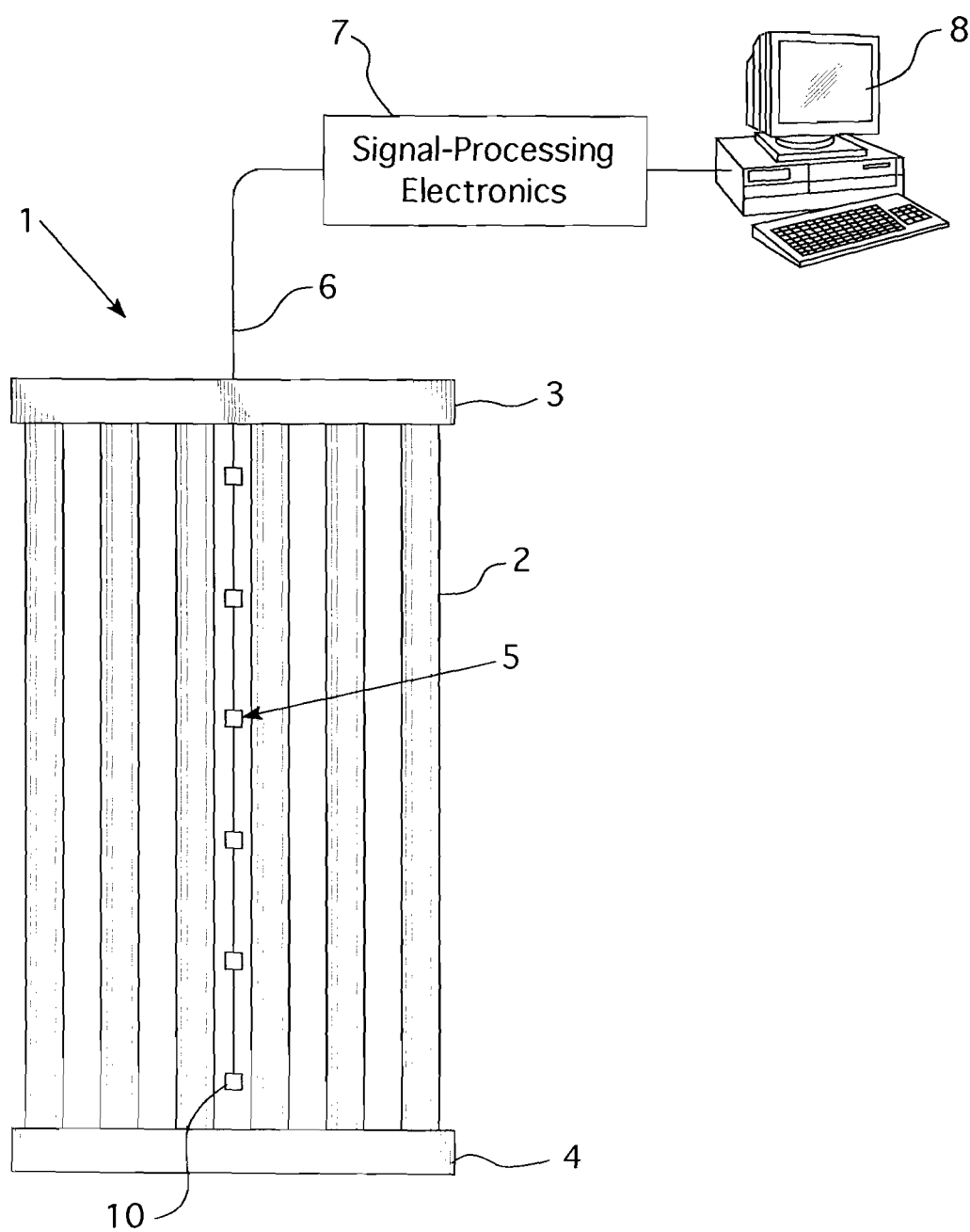
FIG. 2 is a partially schematic view of a neutron and gamma radiation detector string positioned within a spent nuclear fuel assembly in accordance with another embodiment of the present invention.

FIG. 2 schematically illustrates a semiconductor neutron and gamma detector array 5 positioned within a fuel assembly in accordance with another embodiment of the present invention. This embodiment is similar to that shown in FIG. 1, except the detector array 5 is located in the middle of the rack of fuel assemblies 2.

The detector arrays 5 shown in FIGS. 1 and 2 are connected by a wire 6 or any other suitable means to signal processing electronics 7. The signal processing electronics 7 process voltage pulses produced by interaction of gamma rays and neutron-induced charged particles and electronically counts the pulses. As shown in FIG. 2, a microprocessor 8 may be used to store data and/or generate a video display or a printout of the neutron and gamma ray measurements.

While six individual detectors 10 are shown in FIGS. 1 and 2, any suitable number may be used in the array 5 along the length of the fuel assembly. Preferably, the detector array 5 includes from 2 to about 100 individual semiconductor detectors, more preferably from about 4 to about 50 detectors. The spacing of the semiconductor detectors 10 may be varied depending on the radiation gradient of the fuel assembly. The spacing is chosen to give adequate information on the details of the shape of the axial gradient for a particular fuel type. For example, closer spacing would be used in arrays designed for boiling water reactor (BWR) fuel applications as opposed to pressurized water reactor (PWR) fuel where less severe gradients are encountered.

A typical design for a semiconductor burnup meter comprises a stringer of miniature SiC neutron/gamma detectors located at key axial locations along the fuel assembly over a length of up to about 150 inches. These individual semiconductor detectors preferably simultaneously record neutron and gamma ray count rates. The count rates are multiplexed to a measurement control computer such as a laptop PC. The computer preferably contains software to process the individual neutron and gamma-ray count rates, determine the shape of the burnup profile, and by analysis of the profile shape, accurately determine the total burnup of the assembly. The axial burnup profile data may also be used to accurately determine the maximum burnup location on the fuel assembly if desired for spent fuel cask loading operations.

Each semiconductor detector 10 preferably comprises a neutron converter layer and a semiconductor active region which is designed to avoid radiation damage to the semiconductor material. Deterioration of prior art solid state radiation detectors caused by damage by energetic particles is a well known phenomenon. The accumulation of radiation damage in the semiconductor material leads to increased leakage current and decreased charge collection efficiency. This radiation damage is caused by the displacement of atoms in the semiconductor by the energetic charged particles. Over time, this damage causes substantial deterioration of detector performance.

As a charged particle loses energy in a material, it creates both electron excitation events and displaced atoms. The energy loss can be described by the Bragg curve. The preferred neutron detector array of the present invention takes advantage of the change in the partitioning between electronic excitation and displacement events along the range of the charged particle. For high energy alpha particles ($^{4}$He ions), electron excitation is the predominant energy loss mechanism. As the particle loses energy, the importance of displacement damage increases. Most of the displacement damage therefore occurs near the end of the range of travel of the charged particles.

In the preferred semiconductor detectors 10 the type of neutron converter layer, the type of semiconductor material, and the thickness and placement of the semiconductor active region are controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse. The relatively thin semiconductor detectors are substantially less susceptible to radiation damage than conventional thick semiconductor detectors. These detectors may then be used to more accurately measure the axial burnup profile of a fuel assembly.

The preferred method of implementing the use of dimensional reactivity management to improve the burnup credit desirably employs three separate actions. The first is to determine the actual axial burnup shapes of each fuel assembly in the spent fuel container. It should be appreciated that the spent fuel container may be a spent fuel pool, a separate storage container or a spent fuel shipping container and is not limited to the spent fuel pools in which most spent nuclear fuel assemblies are currently stored. The second item is the regeneration of the burnup credit limits including the characterization of axial burnup shape as a separate dimension of protection, like average burnup is currently employed. The third overall action is the implementation of the method in an automated tool that tracks the axial burnup shape data and uses it to determine the acceptability of the placement of the fuel in the spent fuel container. The first action could be accomplished in either of two ways: by regenerating the core models for all operating cycles and deriving the shapes from those results, or by using a burnup measurement device like the one described above, to provide an actual measurement. The second action requires the re-generation of the enrichment versus current burnup curves as a function of the number of fuel assemblies within the container that immediately surround the proposed placement location that have the adverse axial burnup distribution that is assumed in the prior art calculations. The third action can be accomplished by storing the axial burnup data in a database such as TracWorks, a fuel management database program that is licensable from Westinghouse Electric Corporation LLC and is currently employed to support the implementation of the spent fuel pool burnup credit. TracWorks would have to be upgraded as described hereafter to take into account dimensional reactivity management.

Figure 3:
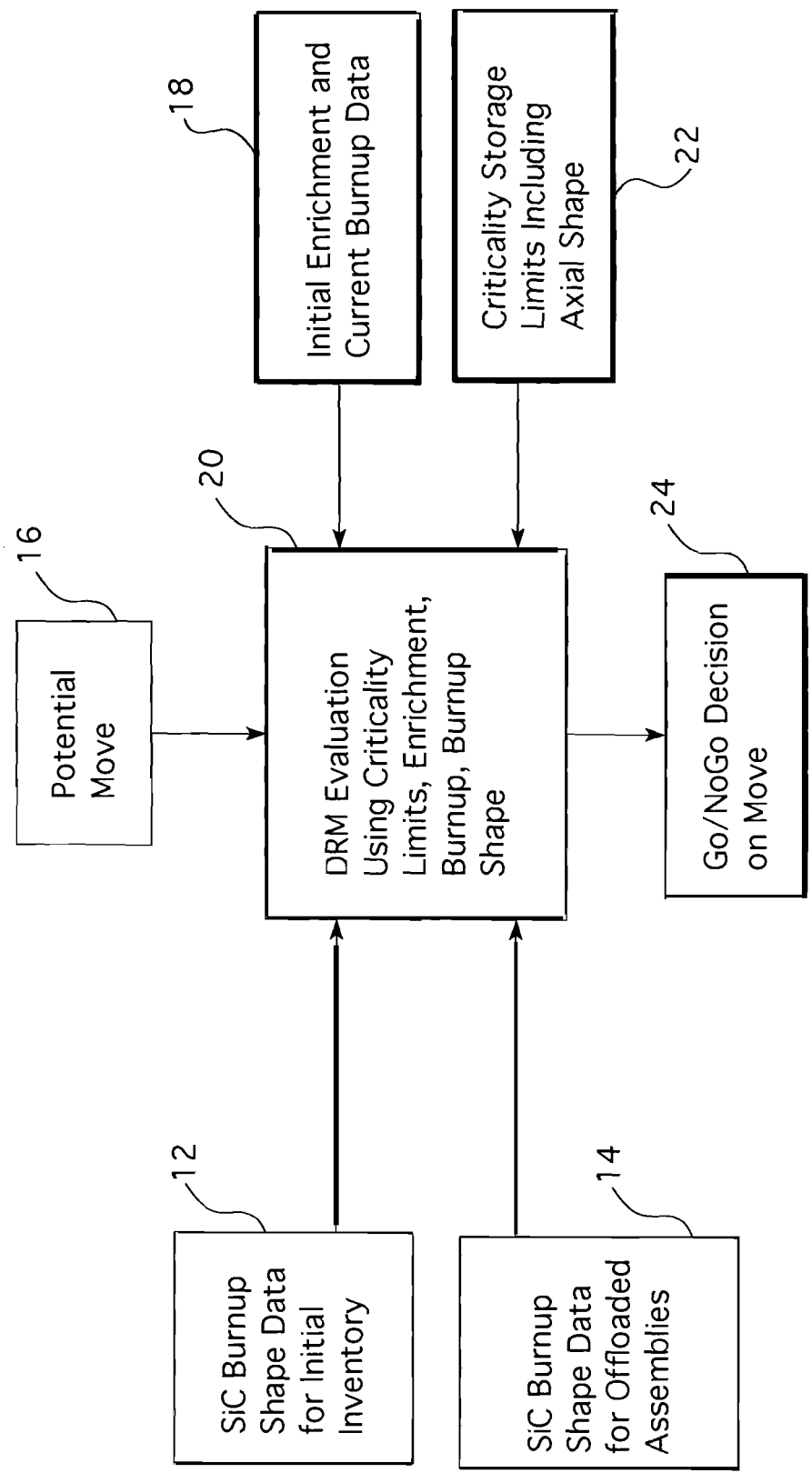
FIG. 3 is a block diagram of the method of this invention.

The system of this invention is generally illustrated by the block diagram shown in FIG. 3 and uses a database management software such as Trac Works, described in U.S. Pat. No. 5,793,636, as the basic data management tool. The axial burnup shapes of the current spent fuel pool inventory is measured once using a burnup meter such as that described with regard to FIGS. 1 and 2. This information is inputted at 12 to TracWorks 20 as shown in FIG. 3, though it should be appreciated that other database management software may also be used for this purpose. The burnup shape data for any fuel assemblies that are offloaded from the spent fuel pool are also entered at 14 into TracWorks 20. The criticality storage limits as a function of the axial burnup distribution shape as represented by the initial enrichment vs. burnup curves that will be described hereafter are inputted at 22 into TracWorks. Additionally, the initial enrichment and current burnup data that was measured for the new spent fuel assembly being positioned within the spent fuel pool is entered at 18 and the coordinates of the location that the new fuel assembly will be positioned at are entered at 16. Data for each fuel assembly coming from the core into the spent fuel pool or other storage container is acquired by measurement prior to being placed in a location in a spent fuel pool, for which the axial shape credit is required. The criticality analysis has to be performed, taking credit for the axial burnup shape and providing limits on initial enrichment, average burnup and burnup shape to TracWorks. These limits are embodied in the curves that will be described with respect to FIGS. 5 and 6. Each potential placement of an assembly in the spent fuel pool is then evaluated for acceptability by TracWorks using the limits from the criticality analysis, the initial enrichment and average burnup and the measured burnup shape data.

Figures 4, 5:
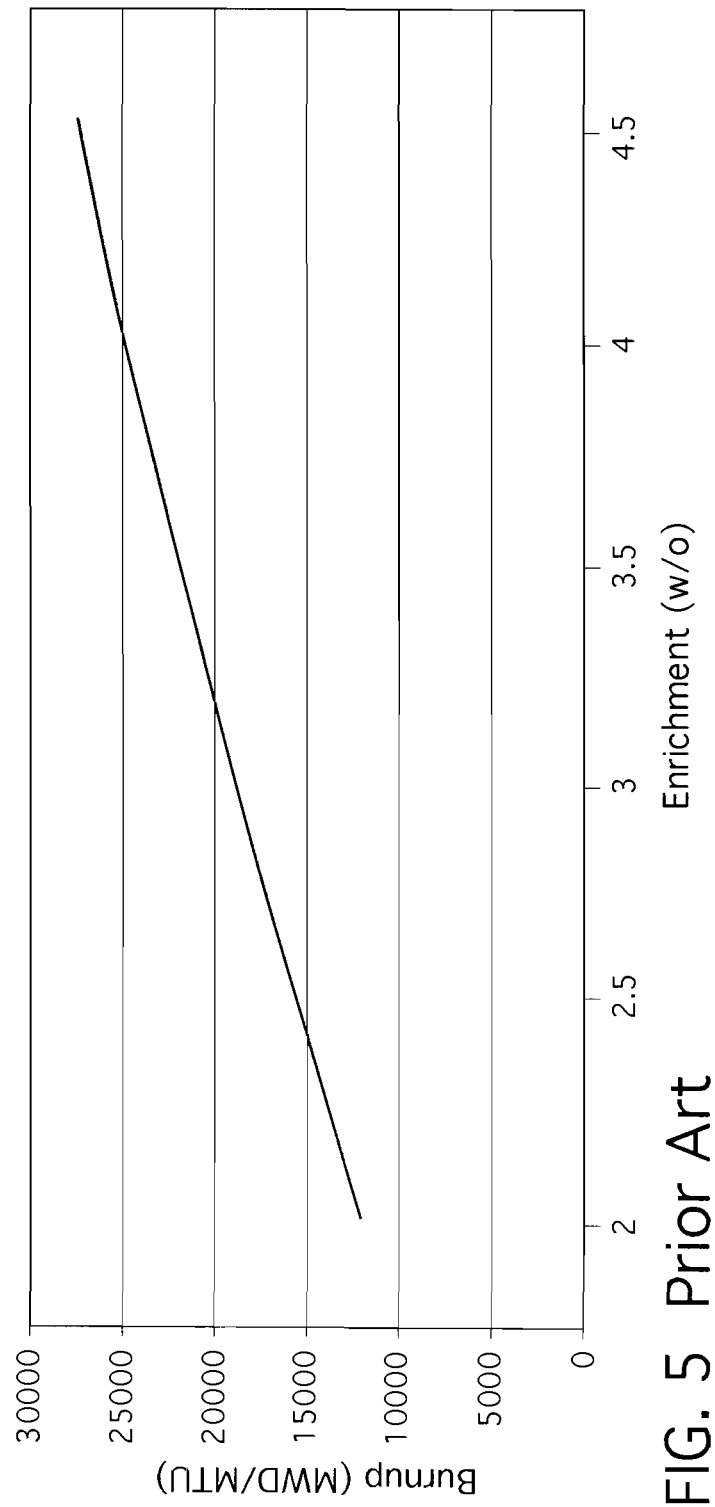
FIG. 4 is a graphical layout representation of the placement of a spent fuel assembly within a spent fuel storage pool.
FIG. 5 is a graph of initial enrichment vs. current burnup used in the criticality analysis employed by the prior art assuming a common, adverse axial distribution for all assemblies, to determine whether or not an assembly can be placed in a given spent fuel storage location.

For example, when fuel assemblies 2 are arranged in the spent fuel pool, the most common arrangement is based on a grouping of 2×2 sets of locations where the desired location for the assembly being placed is in common to all four. More specifically, as an example, consider FIG. 4 where the location for the assembly to be placed is B2, and the four 2×2 sets are (A1, A2, B1, B2), (B1, B2, C1, C2), (A2, A3, B2, B3), and (B2, B3, C2, C3). When the assembly is placed, it must satisfy the constraints in all four of these sets of locations. Any of a number of geometry-based restrictions can be implemented: all locations (4/4), 3 out of 4 with one empty (3/4), 2 out of 4 in a checkerboard fashion (2/4), etc. For the purposes of this example, consider the restrictions for 4/4 placement, assuming all of the other eight locations are filled. In the current state of the art, the criticality analysis assumes a common, adverse axial burnup distribution for all assemblies and a single curve of initial enrichment versus current burnup is used to determine whether or not an assembly can be placed in the location B2. That prior art curve is shown in FIG. 5. An assembly whose enrichment and burnup fall above the curve can be placed in B2. In the preferred embodiment of this invention there would be up to five curves, where each curve represents the criticality limit for an assembly based on the axial burnup distributions of the other assemblies in the 2×2 sets of locations.

Figure 6:
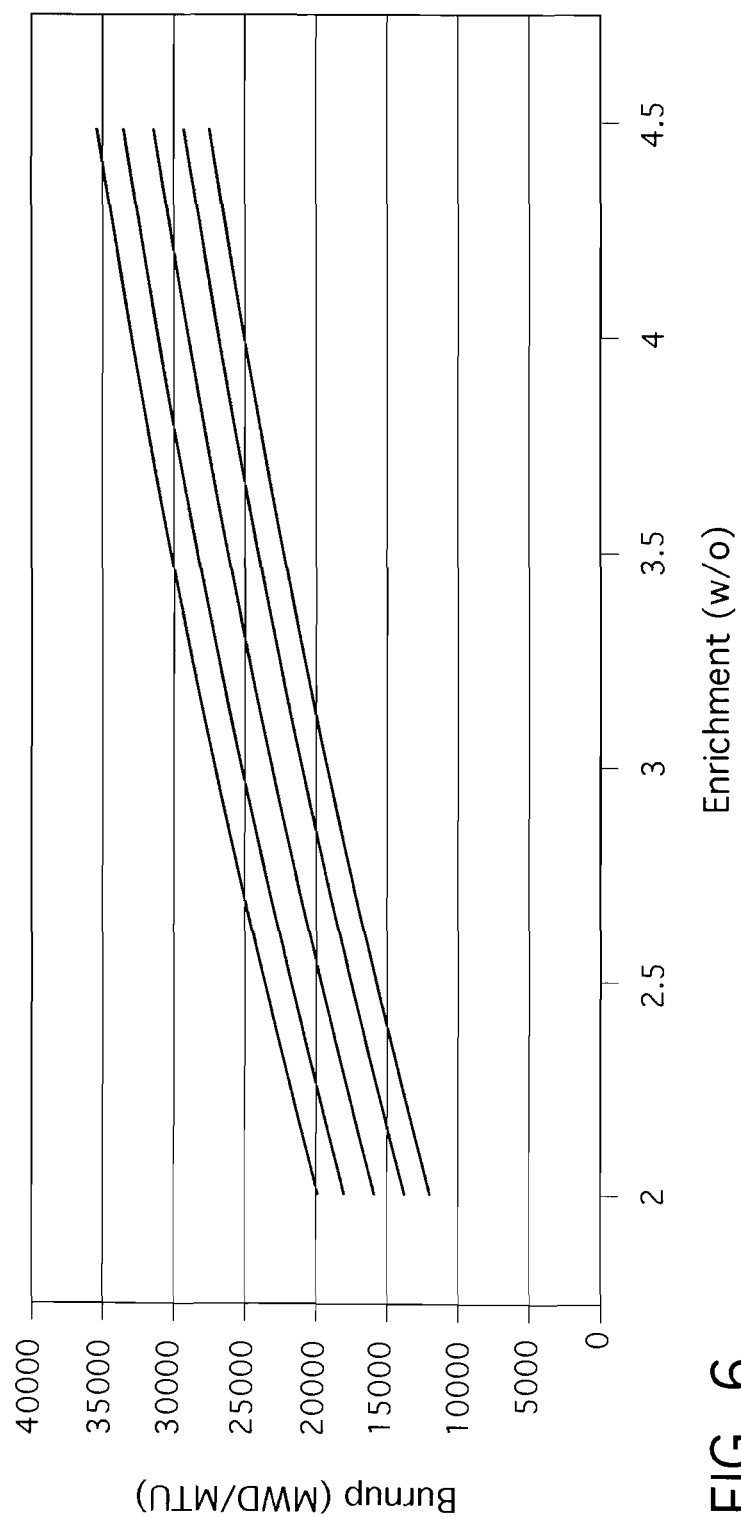
FIG. 6 is a series of graphical plots of initial enrichment vs. current burnup employed by this invention to apply dimensional reactivity management.

FIG. 6 shows the preferred embodiment of this invention employing five curves for a 2×2 array with all four locations filled, though it should be appreciated that between 2 and 5 curves may also be used with some sacrifice of margin if less than five curves are employed. On FIG. 6 the uppermost curve represents the situation where all 4 assemblies have the adverse burnup shape and corresponds to the curve shown in FIG. 5. The next curve down represents the situation where three of the four have the adverse axial burnup shape. The third curve down represents the situation where 2 of the 4 have the adverse axial burnup shape. The fourth curve down, second from the lower most curve, represents the situation where only one assembly has the adverse axial burnup shape. Similarly, the bottom most curve represents the situation where no assembly has the adverse axial burnup shape. The five curves represents the limits for a 2×2 array. If the array is different from 2×2 or all four locations are not going to be filled (e.g., 3/4) the limit on the number of curves will be different. The limit on the number of curves will be one more than the number of filled locations in the basic array (e.g., if the array is 3×3, there should be 10 curves, while a 2×2 using a 3/4 loading restriction would have 4). Additionally, it should be appreciated that the curves do not necessarily have to be parallel as shown in FIG. 6. The shape of the curves will in part be dependent on the specific loading restrictions being utilized. In this way, the management of the axial burnup shape data can provide significant additional margin that would otherwise be unavailable, and enable a tighter packing of the spent fuel that would open up space for additional assemblies.

While specific embodiments of the invention have been described in detail, it would be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A method of determining the acceptability of the placement of a new spent nuclear fuel assembly within a spent fuel storage container wherein there are X number of spent fuel assemblies surrounding the placement of the new spent fuel assembly and X+1 is a number of the new spent fuel assembly plus the X number of spent fuel assemblies surrounding the placement of the new spent fuel assembly, comprising the steps of:

generating a series of curves made up of a number of curves of enrichment vs. current burnup, each curve representing a different number of the X+1 spent fuel assemblies that have an adverse axial burnup distribution commonly used in the industry;

verifying the actual axial burnup distribution of each of the X+I fuel assemblies;

noting how many of the X+I spent fuel assemblies have the adverse axial burnup distribution;

identifying which of the number of curves applies to the new spent fuel assembly from the number of spent fuel assemblies noted as having the adverse axial burnup distribution;

finding a point on the graph on which the curve that applies to the new spent fuel assembly is plotted that corresponds to a current burnup and initial enrichment for the new spent fuel assembly; and determining whether the point on the graph is above the applicable curve, wherein if the point on the graph is above the applicable curve the placement of the new spent fuel assembly is acceptable.

2. The method of claim 1 wherein X is equal to three.

3. The method of claim 2 wherein the number of curves in the series of curves amounts to five curves.

4. The method of claim 1 wherein the number of curves in the series of curves equals X+2.

5. The method of claim 4 wherein the series of X+2 curves comprises five spaced curves one above another with the upper most curve representing all of the fuel assemblies having the adverse axial burnup distribution and the lower most curve representing none of the X+1 spent fuel assemblies having the adverse axial burnup distribution with each of the curves in between the upper most curve and the lower most curve representing a different number of the X+1 fuel assemblies having the adverse axial burnup, in descending order of the number of the X+1 fuel assemblies having the adverse axial burnup.

* * * * *